(12) United States Patent
Kumano

(10) Patent No.: US 8,945,269 B2
(45) Date of Patent: Feb. 3, 2015

(54) HOLDING SEALING MATERIAL, METHOD FOR PRODUCING HOLDING SEALING MATERIAL, AND EXHAUST GAS PURIFYING APPARATUS

(71) Applicant: Ibiden Co., Ltd., Ogaki-shi, Gifu (JP)

(72) Inventor: Keiji Kumano, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 50 days.

(21) Appl. No.: 13/676,144

(22) Filed: Nov. 14, 2012

(65) Prior Publication Data

US 2013/0118138 A1    May 16, 2013

(30) Foreign Application Priority Data

Nov. 16, 2011   (JP) ................................. 2011-250995

(51) Int. Cl.
| | | |
|---|---|---|
| B01D 50/00 | (2006.01) | |
| B01D 39/14 | (2006.01) | |
| B01D 39/06 | (2006.01) | |
| B01D 39/20 | (2006.01) | |
| B01D 24/00 | (2006.01) | |
| B01D 46/52 | (2006.01) | |
| B05D 3/00 | (2006.01) | |
| F01N 3/28 | (2006.01) | |
| F01N 3/021 | (2006.01) | |

(52) U.S. Cl.
CPC .............. *B01D 46/528* (2013.01); *B05D 3/007* (2013.01); *F01N 3/2864* (2013.01); *F01N 3/0211* (2013.01); *F01N 2350/04* (2013.01); *Y02T 10/20* (2013.01)

USPC .................. 55/523; 55/522; 55/524; 422/169; 422/170; 422/171; 422/172; 422/177; 422/178; 422/179; 422/180; 422/181; 422/182

(58) Field of Classification Search
CPC ... F01N 3/2853; F01N 3/2864; F01N 3/2857; C04B 30/02; Y02T 10/20
See application file for complete search history.

(56) References Cited

U.S. PATENT DOCUMENTS

| | | | |
|---|---|---|---|
| 7,306,773 B2 * | 12/2007 | Tanaka et al. ................. | 422/179 |
| 7,854,905 B2 * | 12/2010 | Yasuda et al. ................. | 422/179 |
| 8,071,039 B2 * | 12/2011 | Hornback, III ............... | 422/179 |
| 2003/0104189 A1 * | 6/2003 | Agata ........................... | 428/219 |
| 2007/0084171 A1 * | 4/2007 | Kaneko ......................... | 55/523 |
| 2007/0140929 A1 * | 6/2007 | Watanabe et al. ............. | 422/179 |
| 2008/0078150 A1 * | 4/2008 | Kariya .......................... | 55/490 |
| 2009/0060800 A1 * | 3/2009 | Fernandes, Jr. ............... | 422/168 |
| 2009/0285726 A1 * | 11/2009 | Ohshika et al. ............... | 422/179 |
| 2011/0023430 A1 | 2/2011 | Kumar et al. | |

FOREIGN PATENT DOCUMENTS

| | | |
|---|---|---|
| CN | 1488843 | 4/2004 |
| CN | 101152774 | 4/2008 |

(Continued)

*Primary Examiner* — Amber Orlando
(74) *Attorney, Agent, or Firm* — Mori & Ward, LLP

(57) ABSTRACT

A holding sealing material includes a mat, an inorganic binder and an organic binder. The mat includes inorganic fibers and has an upper part, a center part, and a lower part in a thickness direction. The inorganic binder is loaded on the mat. The organic binder is loaded mainly on the upper part and the lower part of the mat. The holding sealing material is disposed between an exhaust gas-treating body and a casing for housing the exhaust gas-treating body to form an exhaust gas purifying apparatus.

17 Claims, 5 Drawing Sheets

A-A line cross-sectional view

(56) References Cited

FOREIGN PATENT DOCUMENTS

| CN | 101821488 | 9/2010 |
|---|---|---|
| EP | 1296030 | 3/2003 |
| EP | 1895119 | 3/2008 |
| EP | 2381078 | 10/2011 |
| JP | 2002-004848 | 1/2002 |
| KR | 10-2009-0032919 | 4/2009 |
| WO | WO 2005/021945 | 3/2005 |
| WO | WO 2006/020058 | 2/2006 |
| WO | WO 2009/032147 | 3/2009 |

* cited by examiner

A-A line cross-sectional view

HOLDING SEALING MATERIAL, METHOD FOR PRODUCING HOLDING SEALING MATERIAL, AND EXHAUST GAS PURIFYING APPARATUS

CROSS-REFERENCE TO RELATED APPLICATIONS

The present application claims priority under 35 U.S.C. §119 to Japanese Patent Application No. 2011-250995, filed on Nov. 16, 2011, the contents of which are incorporated herein by reference in their entirety.

BACKGROUND OF THE INVENTION

1. Field of the Invention

The present invention relates to a holding sealing material, a method for producing a holding sealing material, and an exhaust gas purifying apparatus.

2. Discussion of the Background

Exhaust gases discharged from internal combustion engines such as diesel engines contain particulate matter (also referred to as PM) such as soot, and in recent years, the harm that the PM causes to the environment and the human body has become a problem. Exhaust gases also contain harmful gas components such as CO, HC and NOx, and the harm that these harmful gas components cause to the environment and the human body has become a further problem.

To solve such problems, there have been proposed various exhaust gas purifying apparatuses including an exhaust gas-treating body formed of a porous ceramic material such as silicon carbide or cordierite, a casing for housing the exhaust gas-treating body, and a holding sealing material formed of inorganic fibers disposed between the exhaust gas-treating body and the casing, as exhaust gas purifying apparatuses for collecting PM in exhaust gases and purifying harmful gas components. The holding sealing material is disposed mainly for the purpose of preventing damage in the exhaust gas-treating body caused by a contact with the casing covering the periphery of the exhaust gas-treating body due to vibrations and impact generated during driving of the vehicle, and preventing leakage of exhaust gases from between the exhaust gas-treating body and the casing.

The holding sealing material is a rectangular mat having short sides and long sides in a plan view. Commonly, a quadrangle depression is formed on a first short side and a protrusion engaging with the depression is formed on a second short side that is an opposite side of the first short side. The holding sealing material is mainly formed of inorganic fibers such as alumina fibers.

In production of the exhaust gas purifying apparatus, a holding sealing material in the shape mentioned above is wound around an exhaust gas-treating body, and canning is performed for housing the exhaust gas-treating body (hereinafter, also referred to as a wound body) with the holding sealing material wound therearound in a casing by any available method.

JP-A 2002-4848 discloses a holding sealing material having features mentioned below for preventing scattering of inorganic fibers from a holding sealing material during the canning. Namely, an organic or inorganic binder is loaded on a mat-like material formed of inorganic fibers. The density of inorganic fibers is adjusted so that the packing density after winding is set within a range of 0.1 to 0.6 g/cm³. When the mat-like material is divided in the thickness direction into three parts including an upper part, a center part, and a lower part, distribution of solids in the binder loaded on the mat-like substance is higher in the upper and lower parts than in the center part.

The contents of JP-A 2002-4848 are incorporated herein by reference in their entirety.

SUMMARY OF INVENTION

According to one aspect of the present invention, a holding sealing material includes a mat, an inorganic binder and an organic binder. The mat includes inorganic fibers and has an upper part, a center part, and a lower part in a thickness direction. The inorganic binder is loaded on the mat. The organic binder is loaded mainly on the upper part and the lower part of the mat. The holding sealing material is disposed between an exhaust gas-treating body and a casing for housing the exhaust gas-treating body to form an exhaust gas purifying apparatus.

According to another aspect of the present invention, a method for producing a holding sealing material includes preparing a mat for a holding sealing material. The mat is needle-punched and includes inorganic fibers. The mat is contacted with an inorganic binder-containing liquid containing an inorganic binder to impregnate the inorganic fibers in the mat with the inorganic binder-containing liquid. The mat impregnated with the inorganic binder-containing liquid is dehydrated to control an amount of the inorganic binder-containing liquid loaded on the inorganic fibers within a predetermined range. An organic binder-containing liquid containing an organic binder is sprayed to a main face of an upper part of the mat and to a main face of a lower part of the mat. The mat loaded with the inorganic binder-containing liquid and the organic binder-containing liquid is dried.

According to further aspect of the present invention, an exhaust gas purifying apparatus includes a casing, an exhaust gas-treating body housed in the casing and the holding sealing material. The holding sealing material is wound around the exhaust gas-treating body and is disposed between the exhaust gas-treating body and the casing.

According to further aspect of the present invention, an exhaust gas purifying apparatus includes a casing, an exhaust gas-treating body housed in the casing and the holding sealing material produced by the method. The holding sealing material is wound around the exhaust gas-treating body and is disposed between the exhaust gas-treating body and the casing.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENT

Figure 1A:
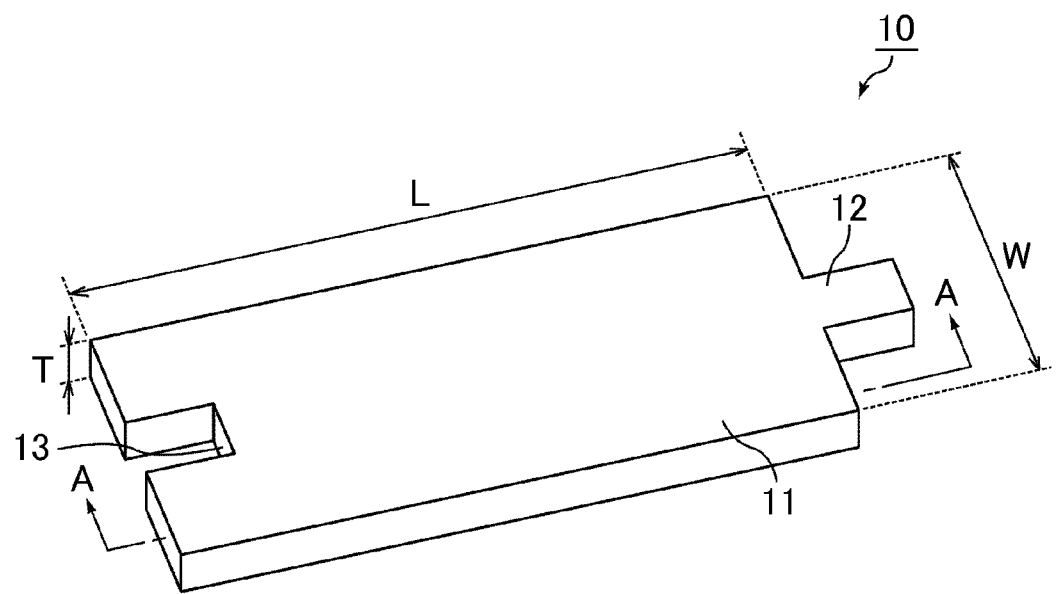
FIG. 1A is a cross-sectional view schematically illustrating one example of a holding sealing material according to a first embodiment of the present invention.

The holding sealing material according to the embodiment of the present invention is a holding sealing material to be included in an exhaust gas purifying apparatus, the exhaust gas purifying apparatus including: an exhaust gas-treating body; a casing for housing the exhaust gas-treating body; and the holding sealing material formed of inorganic fibers disposed between the exhaust gas-treating body and the casing, wherein the holding sealing material includes a mat in a predetermined thickness loaded with an inorganic binder and an organic binder, and when the mat is divided in a thickness direction into three parts including an upper part, a center part, and a lower part, the organic binder is mainly loaded on the upper part and the lower part.

In the holding sealing material according to the embodiment of the present invention, an inorganic binder is loaded on fiber surfaces. Accordingly, friction among fibers is presumably improved (the inorganic binder fixes the inorganic fibers at intersections where inorganic fibers are close to one another). This tends to increase the surface pressure and shear stress of the holding sealing material. Accordingly, the holding sealing material included in an exhaust gas purifying apparatus tends to have an enhanced force for holding an exhaust gas-treating body, and a mat is not too much deformed during canning. As a result, canning process is efficiently performed.

In the holding sealing material according to the embodiment of the present invention, an inorganic binder is loaded on inorganic fibers in the mat and an organic binder is loaded on an upper part and a lower part of the mat. Accordingly, intersections of fibers are fixed with the inorganic binder and voids between the fibers and the intersections are filled with the organic binder. Therefore, scattering of fibers tends to be reduced compared to the case where an organic binder or an inorganic binder is solely used. Such a synergy effect makes it easier to enclose short and easily-scattering inorganic fibers inside the mat and to suppress scattering of inorganic fibers during canning so that the work environment during canning is more easily improved.

In the case where both an inorganic binder and an organic binder are loaded on inorganic fibers included in a mat, easiness of winding the mat around an exhaust gas-treating body tends to be improved, compared to the case where only an inorganic or organic binder is loaded on inorganic fibers included in the mat. The presumable reason is mentioned below. In the center part of the mat, intersections of inorganic fibers are fixed with an inorganic binder and voids are left among the inorganic fibers. The mat therefore has excellent flexibility and is easily bent when wound around an exhaust gas-treating body. On the other hand, in the upper part and the lower part of the mat, voids formed by the inorganic fibers other than intersection parts are filled with the organic binder. Accordingly, the mat is hardly cracked even when the face in contact with the exhaust gas-treating body and the opposite face of the mat expand or contract, so that the mat is still easily bent.

Herein, a concept of canning is used to include winding of a holding sealing material around an exhaust gas-treating body and housing of a wound body in a casing.

In the holding sealing material according to the embodiment of the present invention, the loaded amount of the organic binder per unit weight of inorganic fibers is larger on the upper part of the mat than on the lower part of the mat, or the loaded amount of the organic binder per unit weight of inorganic fibers is larger on the lower part of the mat than on the upper part of the mat.

In the holding sealing material according to the embodiment of the present invention, the loaded amount of the organic binder per unit weight of inorganic fibers in the mat is larger on the lower part than on the upper part, or larger on the upper part than on the lower part. Accordingly, the holding sealing material is disposed in an exhaust gas purifying apparatus in such a manner that the face on which more organic binder is loaded is in contact with a casing and the face on which less organic binder is loaded is in contact with an exhaust gas-treating body.

In the holding sealing material according to the embodiment of the present invention, the mat is wound around an exhaust gas-treating body when the holding sealing material is to be included in an exhaust gas purifying apparatus. Commonly, inorganic fibers of a mat are likely to be scattered from a face in contact with the casing. In the holding sealing material according to the embodiment of the present invention, however, more organic binder is loaded on a part in contact with the casing. Accordingly, arrangement of the holding sealing material as mentioned above allows enclosure of easily-scattering inorganic fibers inside the mat, so that the inorganic fibers are less likely to be scattered. As a result, scattering of inorganic fibers during canning is more easily suppressed.

Arrangement of the mat as mentioned above makes it easier to prevent cracking of the mat in apart in contact with the casing and also to prevent creases in a part in contact with the exhaust gas-treating body.

Namely, if the loaded amount of an organic binder is small in a part in contact with a casing in a mat, commonly, the mat is cracked in a part in contact with the casing during canning to allow exhaust gases to easily pass through the cracked part. In the holding sealing material according to the embodiment of the present invention, however, development of such a problem is more easily suppressed.

If the loaded amount of an organic binder is too large in a part in contact with an exhaust gas-treating body in a mat, commonly, creases are caused in the part in contact with the exhaust gas-treating body to allow exhaust gases to easily pass through the part with creases. In the holding sealing material according to the embodiment of the present invention, however, development of such a problem is more easily suppressed.

In the holding sealing material according to the embodiment of the present invention, the loaded amount of the organic binder per unit weight of inorganic fibers on the upper part is from about 0.5 to about 10.0 g/100 g and the loaded amount of the organic binder per unit weight of inorganic fibers is larger on the lower part than on the upper part, or the loaded amount of the organic binder per unit weight of inorganic fibers on the lower part is from about 0.5 to about 10.0 g/100 g and the loaded amount of the organic binder per unit weight of inorganic fibers is larger on the upper part than on the lower part.

Accordingly, scattering of inorganic fibers is more easily suppressed during canning. Arrangement of the mat in such a manner that the face on which more organic binder is loaded is in contact with the casing and the face on which less organic binder is loaded is in contact with the exhaust gas-treating body makes it easier to prevent cracking of the mat in the part in contact with the casing and to crease in the part in contact with the exhaust gas-treating body.

In the holding sealing material according to the embodiment of the present invention, the inorganic fibers include at least one selected from the group consisting of alumina fibers, alumina-silica fibers, silica fibers, biosoluble fibers, and glass fibers. Therefore, the holding sealing material can more easily have required properties such as thermal resistance of the mat.

In the holding sealing material according to the embodiment of the present invention, the biosoluble fibers includes from about 60 to about 85 wt % of silica and from about 15 to about 40 wt % of at least one compound selected from the group consisting of alkali metal compounds, alkaline earth metal compounds, and boron compounds. Therefore, even if the biosoluble fibers are taken into human body, they are easily dissolved and thus are excellent in safety for human body.

In the holding sealing material according to the embodiment of the present invention, the organic binder includes an epoxy resin, an acrylic resin, a rubber resin, or a styrene resin. Therefore, the easily-scattering inorganic fibers are more easily enclosed inside the mat.

In the holding sealing material according to the embodiment of the present invention, the thickness of the mat forming the holding sealing material is from about 1.5 to about 50 mm. Thus, the holding sealing material tends to have sufficient holding force, leading to easier winding around an exhaust gas-treating body.

In the holding sealing material according to the embodiment of the present invention, the inorganic fibers have an average fiber length of from about 50 μm to about 100 mm and an average diameter of from about 2 to about 10 μm. Therefore, the inorganic fibers are more easily intertwined from one another by needle-punching treatment.

In the holding sealing material according to the embodiment of the present invention, the loaded amount of the inorganic binder per unit weight of inorganic fibers is from about 0.5 to about 3.0 g/100 g in solid content. Therefore, the holding sealing material can more easily fulfill the request for improvement in the surface pressure and shear stress of the mat.

In the holding sealing material according to the embodiment of the present invention, the mat included in the holding sealing material is needle-punched to intertwine the inorganic fibers. Accordingly, the bulk of the mat is appropriately reduced, so that the work efficiency during canning is more easily improved. Moreover, intertwinement of inorganic fibers more easily increases the surface pressure of the mat so that the mat can more easily hold an exhaust gas-treating body.

A method for producing a holding sealing material according to the embodiment of the present invention includes the steps of: preparing a needle-punched mat for a holding sealing material, the mat being formed of inorganic fibers; contacting the mat with an inorganic binder-containing liquid to impregnate the inorganic fibers in the mat with the inorganic binder; dehydrating the mat impregnated with the inorganic binder-containing liquid to control the amount of the inorganic binder-containing liquid loaded on the inorganic fibers within a predetermined range; spraying an organic binder-containing liquid to a main face of an upper part of the mat and to a main face of a lower part of the mat; and drying the mat loaded with the inorganic binder-containing liquid and the organic binder-containing liquid.

In the method for producing a holding sealing material according to the embodiment of the present invention, the loaded amount of the inorganic binder is controlled within a predetermined range during dehydration, and the organic binder is loaded before completion of drying. Accordingly, in a part where both the inorganic binder and the organic binder are present, the binders mixed together increases the viscosity and the adhesiveness of a mixed solution to allow easy clinging thereof to inorganic fibers, so that the mixed solution are more easily loaded on inorganic fibers in a broader area. Easily-scattering inorganic fibers are likely to adhere to the mixed solution loaded on the inorganic fibers. Such a synergy effect of the inorganic binder and the organic binder which contain moisture allows sure enclosure of short inorganic fibers that tend to scatter outside of the mat, inside the mat so that scattering of inorganic fibers during canning is more easily suppressed.

The inorganic binder is loaded on fiber surfaces of the holding sealing material, which presumably improves friction among fibers (increases fixed points for mutually fixing the inorganic fibers). This tends to increase the surface pressure and the shear stress of the holding sealing material. Accordingly, the holding sealing material included in an exhaust gas purifying apparatus has an enhanced force for holding an exhaust gas-treating body, and the mat is not too much deformed during canning. As a result, canning process is more easily performed.

In the method for producing a holding sealing material according to the embodiment of the present invention, the inorganic fibers include at least one selected from the group consisting of alumina fibers, alumina-silica fibers, silica fibers, biosoluble fibers, and glass fibers. Therefore, the holding sealing material can more easily have required properties such as thermal resistance of the mat.

In the method for producing a holding sealing material according to the embodiment of the present invention, the biosoluble fibers includes from about 60 to about 85 wt % of silica and from about 15 to about 40 wt % of at least one compound selected from the group consisting of alkali metal compounds, alkaline earth metal compounds, and boron compounds. Therefore, even if the biosoluble fibers are taken into human body, they are easily dissolved and thus are excellent in safety for human body.

In the method for producing a holding sealing material according to the embodiment of the present invention, the inorganic fibers have an average fiber length of from about 50 μm to about 100 mm and an average diameter of from about 2 to about 10 μm. Therefore, the inorganic fibers are more easily intertwined from one another by needle-punching treatment In the method for producing a holding sealing material according to the embodiment of the present invention, the inorganic binder-containing liquid is an alumina sol or a silica sol.

The alumina sol or silica sol is used for coating inorganic materials and is excellent in adhesion to a base substance. Accordingly, in loading of the inorganic binder, the inorganic binder is loaded on inorganic fibers as the base substance with favorable adhesiveness to more easily satisfy the above properties required for the holding sealing material.

In the method for producing a holding sealing material according to the embodiment of the present invention, the dehydration is performed by vacuum dehydration. Adjustment of a vacuum force can more easily control the amount of the inorganic binder loaded on the inorganic fibers included in the mat.

In the method for producing a holding sealing material according to the embodiment of the present invention, the organic binder-containing liquid is a latex containing acrylic, acrylonitrile-butadiene, or styrene-butadiene rubber dispersed in water. Therefore, presumably, the organic binder-containing liquid having excellent adhesiveness adheres to easily-scattering short inorganic fibers and the rubber therein bonds the short inorganic fibers and long inorganic fibers. Accordingly, scattering of inorganic fibers from the mat can be more easily prevented.

An exhaust gas purifying apparatus according to the embodiment of the present invention includes: a casing; an exhaust gas-treating body housed in the casing; and a holding sealing material wound around the exhaust gas-treating body and disposed between the exhaust gas-treating body and the casing, wherein the holding sealing material is the holding sealing material according to the aforementioned embodiments of the present invention.

Accordingly, the exhaust gas purifying apparatus can more easily enjoy the effect of the aforementioned holding sealing materials.

An exhaust gas purifying apparatus according to the embodiment of the present invention includes: a casing; an exhaust gas-treating body housed in the casing; and a holding sealing material wound around the exhaust gas-treating body and disposed between the exhaust gas-treating body and the casing, wherein the holding sealing material is produced by the aforementioned methods for producing a holding sealing material.

Accordingly, the exhaust gas purifying apparatus can more easily enjoy the effect of the aforementioned methods for producing a holding sealing material.

The embodiments will now be described with reference to the accompanying drawings, wherein like reference numerals designate corresponding or identical elements throughout the various drawings. The present invention is, however, not limited to the embodiments below and can be appropriately changed to be applied to other embodiments in the scope that does not change the gist of the present invention.

First Embodiment

Referring to the drawings, the following will describe a first embodiment that is one embodiment of the holding sealing material and the exhaust gas purifying apparatus of the present invention.

First, a holding sealing material according to the first embodiment of the present invention is described.

Figure 1B:
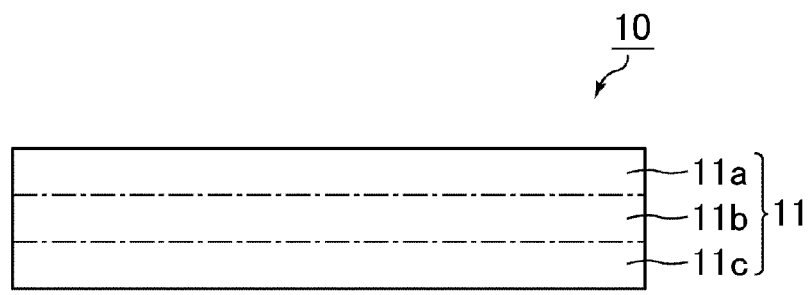
FIG. 1B is a schematic cross-sectional view in parallel with the longitudinal direction of the holding sealing material.

FIG. 1A is a perspective view schematically illustrating one example of the holding sealing material according to the first embodiment of the present invention. FIG. 1B is a cross-sectional view schematically illustrating a cross section of the holding sealing material cut in a direction parallel with the longitudinal direction thereof.

A holding sealing material 10 according to the first embodiment of the present invention illustrated in FIG. 1A and FIG. 1B includes a mat 11 in an approximately rectangular plate-like shape having a predetermined length (shown by an arrow L in FIG. 1A), a predetermined width (shown by an arrow W in FIG. 1A), and a predetermined thickness (shown by an arrow T in FIG. 1A) in a plan view.

In the mat 11 illustrated in FIG. 1A, a protrusion 12 is formed at a first end in the length direction of the mat 11 and a depression 13 is formed at a second end in the length direction of the mat 11. The protrusion 12 and the depression 13 engage with each other when the mat 11 is wound around an exhaust gas-treating body for assembly of an exhaust gas purifying apparatus described later.

The mat 11 includes inorganic fibers as a main component. To the inorganic fibers, an inorganic binder and an organic binder are loaded.

The inorganic fibers are at least one selected from the group consisting of alumina fibers, alumina-silica fibers, silica fibers, biosoluble fibers, and glass fibers.

The alumina fibers may contain, other than alumina, additives such as CaO, MgO, and $ZrO_2$.

The composition ratio of the alumina-silica fibers based on weight ratio is desirably $Al_2O_3:SiO_2$=about 60:about 40 to about 80:about 20 and more desirably $Al_2O_3:SiO_2$=about 70:about 30 to about 74:about 26.

The silica fibers may contain, other than silica, additives such as CaO, MgO and $ZrO_2$.

The biosoluble fibers are inorganic fibers containing, other than silica and the like, at least one compound selected from the group consisting of alkali metal compounds, alkaline earth metal compounds, and boron compounds.

Since the biosoluble fibers containing such compounds are easily dissolved even if the fibers are taken into human body, a mat including the biosoluble fibers is excellent in safety for human body.

A specific composition of the biosoluble fibers is a composition containing about 60 to about 85 wt % of silica and about 15 to about 40 wt % of at least one compound selected from the group consisting of alkali metal compounds, alkaline earth metal compounds, and boron compounds. The silica means SiO or $SiO_2$.

Further, the alkali metal compounds include, for example, oxides of Na and K. The alkaline earth metal compounds include, for example, oxides of Mg, Ca and Ba. The boron compounds include, for example, oxides of B.

The silica content of not lower than about 60 wt % in the composition of the biosoluble fibers makes production by a glass melting method and fiber formation easier.

Further, since the silica content is not lower than 60 wt %, the amount of flexible silica is sufficient, and thus the structure is not fragile. In addition, the biosoluble fibers tend not to be easily dissolved in physiological saline because the amount of at least one compound selected from the group consisting of alkali metal compounds, alkaline earth metal compounds, and boron compounds which are easily dissolved in physiological saline is relatively large.

Moreover, since the silica content is not more than about 85 wt %, the biosoluble fibers are easily dissolved in physiological saline because the amount of at least one compound selected from the group consisting of alkali metal compounds, alkaline earth metal compounds, and boron compounds tends not to be relatively small.

Additionally, the silica content is calculated from the amounts of SiO and $SiO_2$, in terms of $SiO_2$.

In the composition of the biosoluble fibers, the amount of at least one compound selected from the group consisting of alkali metal compounds, alkaline earth metal compounds, and boron compounds is preferably from about 15 to about 40 wt %. Since the amount of at least one compound selected from the group consisting of alkali metal compounds, alkaline earth metal compounds, and boron compounds is not lower than 15 wt %, the biosoluble fibers are easily dissolved in physiological saline difficult.

Furthermore, since the amount of at least one compound selected from the group consisting of alkali metal compounds, alkaline earth metal compounds, and boron compounds is not more than about 40 wt %, production by a glass melting method and fiber formation are more easily performed. Since the amount of at least one compound selected from the group consisting of alkali metal compounds, alkaline earth metal compounds, and boron compounds is not more than about 40 wt %, the biosoluble fibers are not excessively easily dissolved in physiological saline.

The solubility of the biosoluble fibers in physiological saline is desirably about 30 ppm or higher. It is because, if the solubility is not less than about 30 ppm, the biosoluble fibers taken into human body are easily discharged from the body, which is preferable in terms of health.

The glass fibers contain silica and alumina as main components, and further contain calcia, titania, zinc oxide and the like, other than alkali metals.

The fiber density (weight per unit area) of the mat according to the embodiment of the present invention is, though not particularly limited, preferably from about 200 to about 4000 g/m$^2$ and more preferably from about 1000 to about 3000 g/m$^2$. The fiber density of the mat of not less than about 200 g/m$^2$ does not fail to provide the mat with an enough holding force as a holding sealing material. The fiber density of the mat of not more than about 400 g/m$^2$ tends to reduce the bulk of the mat. Accordingly, use of such a mat as a holding sealing material in production of an exhaust gas purifying apparatus tends not to make an exhaust gas-treating body easily come off the casing.

The bulk density (bulk density of the holding sealing material before canning) of the mat is, though not particularly limited, preferably from about 0.10 to about 0.50 g/cm$^2$. The bulk density of the mat of not less than about 0.10 g/cm$^2$ tends not cause weak intertwinement of inorganic fibers, leading to uneasy removal of the inorganic fibers. As a result, the shape of the mat is more likely to be maintained.

The bulk density of the mat of not more than about 0.50 g/cm$^2$ tends not to make the mat hard so that the mat is not poorly wound around an exhaust gas-treating body and is less likely to be cracked.

The thickness of the mat according to the embodiment of the present invention is, though not particularly limited, preferably from about 1.5 to about 50 mm and more preferably from about 6 to about 20 mm.

The thickness of not less than about 1.5 mm tends to provide a mat with an enough holding force as a holding sealing material. Accordingly, use of such a mat as a holding sealing material in production of an exhaust gas purifying apparatus tends not to make an exhaust gas-treating body easily come off a casing. The thickness of not more than about 50 mm tends not to make a mat thick so that the mat is less likely to be poorly wound around an exhaust gas-treating body and is less likely to be cracked.

The organic binder to be loaded on inorganic fibers included in the mat 11 is not particularly limited, and examples thereof include epoxy resins, acrylic resins, rubber resins, and styrene resins.

Among the above organic binders, rubber resins (latex) are preferable. Examples of the organic binder-containing liquid include solutions in which water-soluble organic polymers such as carboxyl methylcellulose, polyvinyl alcohol, or the like are dissolved, and latex containing acrylic, acrylonitrile-butadiene, or styrene-butadiene rubber dispersed in water.

As illustrated in FIG. 1B, when the mat is divided into three parts including an upper part 11a, a center part 11c, and a lower part 11b, the organic binder is mainly loaded on the upper part 11a and the lower part 11b.

It is preferable that when the mat is divided in a thickness direction into three equal parts including an upper part, a center part, and a lower part, the organic binder is mainly loaded on the upper part and the lower part. At least 60%, preferably at least 70%, more preferably at least 80% of the organic binder is loaded on the upper part and the lower part.

Parts where the organic binder is loaded are not necessarily an upper part and a lower part formed in strict trisection of the mat 11 in the thickness direction. The upper part 11a and the lower part 11b may be slightly smaller or larger than the upper part and the lower part formed in strict trisection of the mat 11.

The organic binder may be slightly loaded on inorganic fibers in the center part 11c, provided that the loaded amount of the organic binder per unit weight of inorganic fibers is smaller than on the upper part or the lower part. The loaded amount of the organic binder per unit weight of inorganic fibers in the center part is preferably 50% or less of the loaded amount of the organic binder per unit weight of inorganic fibers on the upper part or the lower part.

The loaded amount of the organic binder on the upper part 11a of the mat 11 and that on the lower part 11b of the mat 11 are preferably substantially the same.

In each of the upper part 11a and the lower part 11b, the loaded amount of the organic binder per unit weight of inorganic fibers is preferably from about 0.5 to about 10.0 g/100 g, more preferably from about 0.5 to about 6.0 g/100 g, and still more preferably from about 2.0 to about 3.0 g/100 g.

Within the above range, the organic binder is more easily loaded on the inorganic fibers included in the mat 11 and more easily encloses easily-scattering short inorganic fibers inside the mat at the same time. Accordingly, scattering of inorganic fibers during canning can be more easily suppressed.

When the loaded amount of the organic binder per unit weight of inorganic fibers is not less than about 0.5 g/100 g, the amount is less likely to be too small, so that scattering of inorganic fibers can be more easily suppressed. The loaded amount of the organic binder per unit weight of inorganic fibers of not more than about 10.0 g/100 g more easily provides a further practical effect on suppression of scattering of inorganic fibers. In addition, since the loaded amount of the organic binder tends not to be too large, after installation of such a holding sealing material in an exhaust gas purifying apparatus, the amount of organic components decomposed by heat of exhaust gases is not too great, and thus an adverse effect on the surrounding environment is less likely to occur.

If the loaded amount of the organic binder per unit weight of inorganic fibers on the center part 11c is larger than those on the upper part 11a and the lower part 11b, scattering of inorganic fibers is hardly suppressed. In addition, since the total loaded amount of the organic binder becomes too large, after installation of such a holding sealing material in an exhaust gas purifying apparatus, the amount of organic components decomposed by heat of exhaust gases becomes greater to provide an adverse effect on the surrounding environment.

The inorganic binder to be loaded on inorganic fibers included in the mat 11 is not particularly limited, provided that it can fix inorganic fibers to one another by loading the inorganic fibers positioned close to each other. Preferable examples thereof include an alumina sol and a silica sol.

The loaded amount of the inorganic binder per unit weight of inorganic fibers is preferably from about 0.5 to about 3.0 g/100 g in solid content.

The loaded amount of the inorganic binder per unit weight of inorganic fibers of not less than about 0.5 g/100 g in solid content makes it easier to sufficiently suppress scattering of inorganic fibers as mentioned above and to sufficiently increase the surface pressure and shear stress. Moreover, the loaded amount of the inorganic binder per unit weight of inorganic fibers of not more than about 3.0 g/100 g in solid content does not mean excessive loading of the inorganic binder, which tends not to lower the flexibility and the like of the mat and makes it easier to operate canning.

The loading within the above preferable range allows adhesion of easily-scattering short fibers present inside or on the surface of the mat 11 to long fibers that hardly scatter outside of the mat, so that scattering of inorganic fibers is suppressed.

In loading of the inorganic binder on inorganic fibers, the inorganic binder is loaded on a part where inorganic fibers intersect at a close distance or contact with each other, so that the inorganic fibers are mutually fixed at the intersections. Accordingly, a large number of fixed points where the inorganic fibers are partially fixed inside the mat are formed. Then, the resistance against compression and deformation is increased, the surface pressure of the holding sealing material is increased, and the shear stress (shear strength) is also increased. The alumina sol or silica sol included in the inorganic binder become alumina or silica by heating after adhesion to the inorganic fibers to firmly fix the inorganic fibers.

In the holding sealing material according to the first embodiment of the present invention, the organic binder is loaded on the upper part and the lower part of the mat along with loading of the inorganic binder. Intersections of fibers are fixed with the inorganic binder and voids formed by the fibers and the intersections are filled with the organic binder. Accordingly, scattering of fibers is reduced compared to the case where the organic binder or the inorganic binder is solely used. Such a synergy effect allows sure enclosure of easily-scattering inorganic fibers inside the mat and makes it easier to suppress scattering of inorganic fibers during canning. Thus, it becomes easier to improve the work environment during the canning.

The area where the inorganic binder is loaded in the mat 11 is not particularly limited. In terms of improvement in mechanical properties of the mat 11, the inorganic binder is preferably loaded throughout the mat, and preferably loaded uniformly throughout the mat.

The mat 11 included in the holding sealing material 10 is preferably needle-punched to intertwine inorganic fibers.

The needle punching is a treatment in which a fiber-intertwining means such as needles is inserted into and removed from a sheet-like product of inorganic fiber precursors. In the mat 11, inorganic fibers having a comparatively-long average fiber length are three-dimensionally intertwined by needle punching. Namely, the mat 11 is needle-punched in the width direction that is perpendicular to the longitudinal direction, so that inorganic fibers are intertwined. The inorganic fiber precursors will be described later in a method for producing a holding sealing material.

The needle punching appropriately reduces the bulk of the mat 11, so that the work efficiency during canning is increased. In addition, because of intertwinement of inorganic fibers, the surface pressure of the mat 11 is increased.

The inorganic fibers need to have a certain length of the average fiber length for forming an intertwinement structure. For example, the inorganic fibers preferably have an average fiber length of from about 50 μm to about 100 mm. The inorganic fibers preferably have an average diameter of from about 2 to about 10 μm.

Next, the following description will discuss a method for producing a holding sealing material according to the first embodiment.

The method for producing a holding sealing material according to the first embodiment is suitable for producing the holding sealing material according to the first embodiment.

The method for producing a holding sealing material according to the first embodiment of the present invention includes the steps of: preparing a needle-punched mat for a holding sealing material, the mat being formed of inorganic fibers; contacting the mat with an inorganic binder-containing liquid to impregnate the inorganic fibers in the mat with the inorganic binder; dehydrating the mat impregnated with the inorganic binder-containing liquid to control the amount of the inorganic binder-containing liquid loaded on the inorganic fibers within a predetermined range; spraying an organic binder-containing liquid to a main face of an upper part of the mat and to a main face of a lower part of the mat; and drying the mat loaded with the inorganic binder-containing liquid and the organic binder-containing liquid.

(A) Preparation of Mat

In the method for producing a holding sealing material according to the present embodiment, a needle-punched mat for a holding sealing material is first prepared.

The mat 11 included in the holding sealing material 10 of the present embodiment can be prepared by various methods. For example, the following method can be employed. First, a mixture for fiber spinning containing an aqueous basic aluminum chloride solution, silica sol, and the like as raw materials is spun by blowing to prepare inorganic fiber precursors having an average fiber diameter of from about 3 to about 10 μm. Next, the inorganic fiber precursors are compressed to give a continuous sheet-like product in a predetermined size. The sheet-like product is needle-punched and then fired. Accordingly, a mat for a holding sealing material is prepared.

(b) Impregnation

The mat is then made in contact with an inorganic binder-containing liquid so that the inorganic fibers in the mat are impregnated with the inorganic binder.

The inorganic binder-containing liquid is a liquid of alumina sol or a silica sol. Since the concentrate solution has an excessively high concentration, a solution diluted to from about 0.5 to about 5 wt % in solid content is used as the inorganic binder-containing liquid.

A method for contacting the mat with the inorganic binder-containing liquid in the impregnation treatment is not particularly limited. For example, the mat may be immersed in the inorganic binder-containing liquid for impregnation of the inorganic fibers in the mat with the inorganic binder. Alternatively, the inorganic binder-containing liquid may be dropped on the mat by curtain coating or the like for impregnation of the inorganic fibers in the mat with the inorganic binder.

(c) Dehydration

The mat impregnated with the inorganic binder-containing liquid is dehydrated so that the amount of the inorganic binder-containing liquid adhered to the inorganic fibers is adjusted within a predetermined range.

Here, the mat impregnated with the inorganic binder-containing liquid is vacuum-dehydrated for control of the loaded amount of the inorganic binder. The loaded amount of the inorganic binder per unit weight of inorganic fibers is adjusted to from about 0.5 to about 3.0 g/100 g in solid content, by vacuum dehydration.

(d) Spraying

Before the mat in which the amount of the inorganic binder-containing liquid is adjusted by the vacuum dehydration is completely dried, an organic binder-containing liquid is sprayed to the main face of the upper part of the mat and the main face of the lower part of the mat.

Here, as in the case of the inorganic binder, a solution diluted to about from about 0.5 to about 5 wt % in solid content is used as an organic binder-containing liquid in the spraying treatment. The organic binder-containing liquid is finely sprayed to the upper face and the bottom face of the mat. In this manner, the organic binder-containing liquid is loaded on predetermined areas of the upper part and the lower part of the mat.

(e) Drying

The mat loaded with the inorganic binder-containing liquid and the organic binder-containing liquid is dried at a temperature of from about 110° C. to about 140° C. for water evaporation. In this manner, the mat 11 on which the inorganic binder and the organic binder are loaded is produced.

In the method for producing a holding sealing material according to the present embodiment, after the inorganic binder-containing liquid is loaded on inorganic fibers, the organic binder-containing liquid is loaded thereon before completion of drying. Accordingly, the mat before drying contains much moisture inside. In a part where both the inorganic binder and the organic binder are present, the binders mixed together increases the viscosity and the adhesiveness of a mixed solution to allow easy clinging to inorganic fibers, so that the mixed solution are more easily loaded on inorganic fibers in a broader area. Easily-scattering inorganic fibers are likely to be adhered to the mixed solution loaded on the inorganic fibers. Such a synergy effect of the inorganic binder and the organic binder which contain moisture makes it easier to enclose easily-scattering short inorganic fibers inside the mat so that scattering of inorganic fibers during canning is more easily suppressed.

(Exhaust Gas Purifying Apparatus)

The holding sealing material according to the first embodiment of the present invention is used as a holding sealing material for an exhaust gas purifying apparatus.

Next, an exhaust gas purifying apparatus according to the first embodiment of the present invention will be described.

Figure 2:
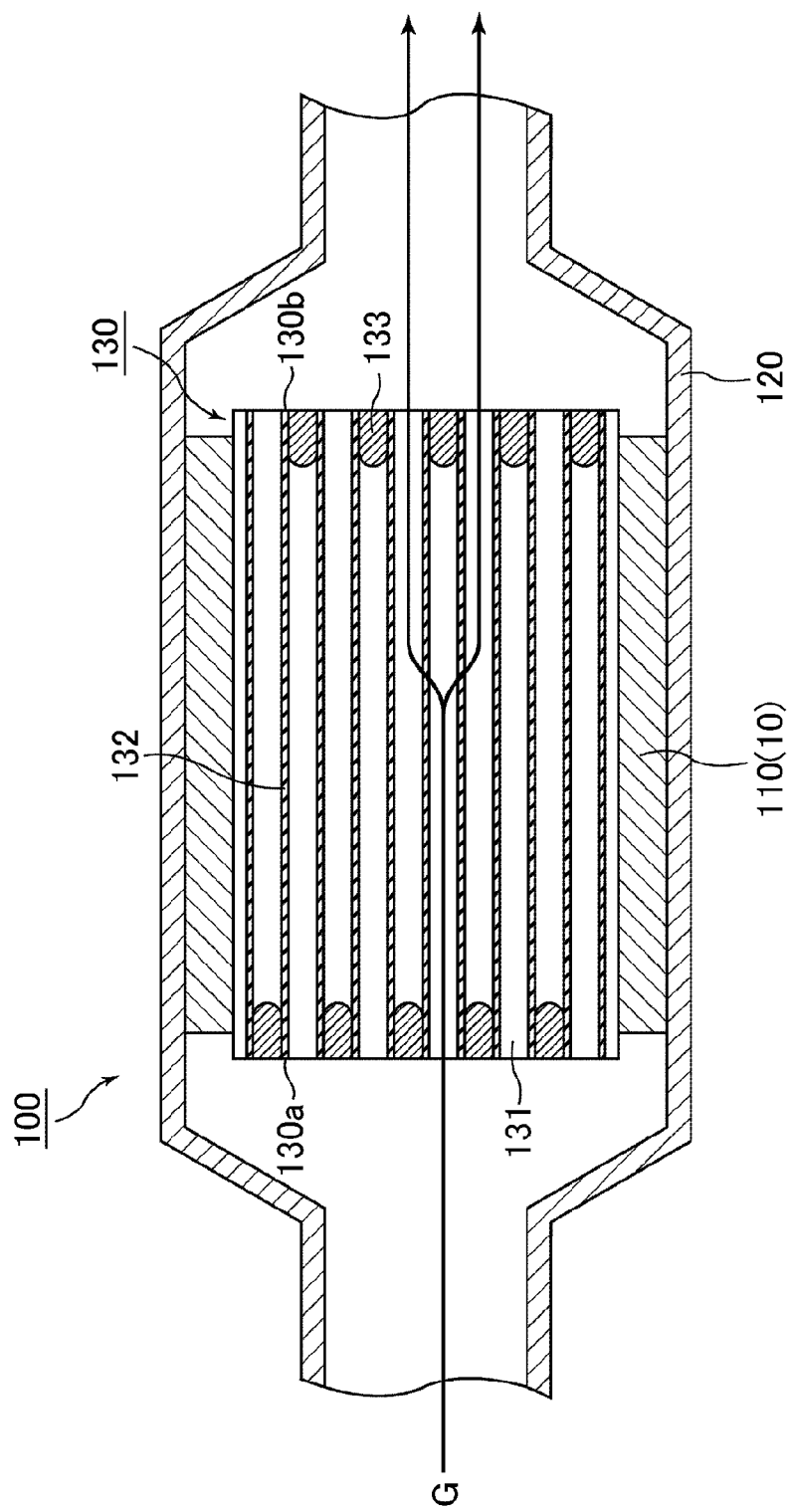
FIG. 2 is a cross-sectional view schematically illustrating one example of an exhaust gas purifying apparatus according to the first embodiment of the present invention.

FIG. 2 is a cross-sectional view schematically illustrating one example of an exhaust gas purifying apparatus according to the first embodiment of the present invention.

As illustrated in FIG. 2, an exhaust gas purifying apparatus 100 according to the first embodiment of the present invention includes a casing 120, an exhaust gas-treating body 130 housed in the casing 120, and a holding sealing material 110 disposed between the exhaust gas-treating body 130 and the casing 120.

The exhaust gas-treating body 130 is a pillar-shaped product in which a large number of cells are longitudinally disposed in parallel with each other and each separated by a cell wall 132. An inlet pipe for introducing exhaust gases discharged from an internal combustion engine and an outlet pipe for discharging the exhaust gases having passed through the exhaust gas-purifying apparatus to the outside are each optionally connected to an end of the casing 120.

In the exhaust gas purifying apparatus 100 illustrated in FIG. 2, an exhaust gas filter (honeycomb filter) in which one of the ends of each cell is sealed with a plug 133 is used as the exhaust gas-treating body 130. Alternatively, a catalyst carrier in which neither of the ends of each cell is sealed with plugs may also be used.

In the exhaust gas purifying apparatus 100 illustrated in FIG. 2, the mat 10 illustrated in FIG. 1A and FIG. 1B is used as the holding sealing material 110.

The following description will discuss a case where exhaust gases pass through the exhaust gas purifying apparatus 100 having the above configuration.

As shown in FIG. 2, exhaust gases discharged from an internal combustion engine and flowing into the exhaust gas purification apparatus 100 (in FIG. 2, G indicates exhaust gases and arrows indicate the flow of the exhaust gases) flow into one cell 131 opening on an end face 130*a* on the exhaust gas inlet side of the exhaust gas-treating body (honeycomb filter) 130 and pass through the cell wall 132 separating the cells 131. At this time, PM in the exhaust gases is collected by the cell wall 132 so that the exhaust gases are purified. The purified exhaust gases flow out of another cell 131 opening on an end face 130*b* on the exhaust gas outlet side to be discharged outside.

The following description will discuss the exhaust gas-treating body (honeycomb filter) and the casing included in the exhaust gas purifying apparatus according to the first embodiment of the present invention.

Here, a description on the holding sealing material included in the exhaust gas purifying apparatus is omitted because it has been described in the description on the holding sealing material according to the first embodiment of the present invention.

The following description will discuss the exhaust gas-treating body included in the exhaust gas purifying apparatus according to the first embodiment of the present invention.

Figure 3:
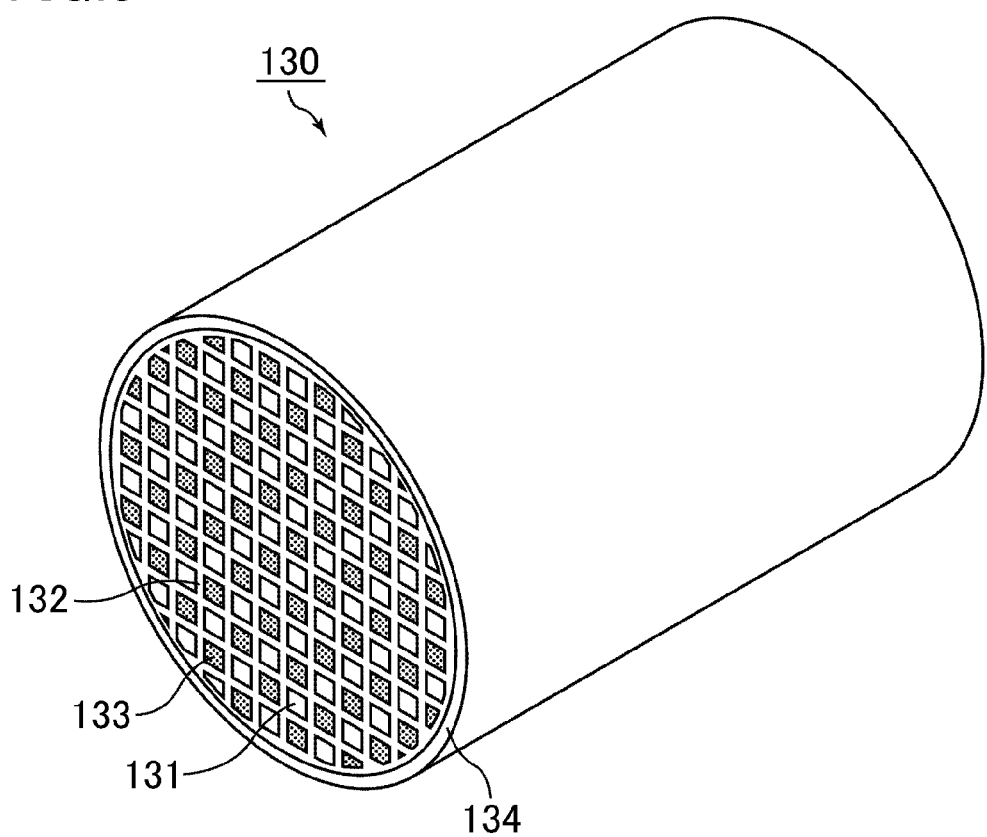
FIG. 3 is a perspective view schematically illustrating one example of an exhaust gas-treating body included in the exhaust gas purifying apparatus according to the first embodiment of the present invention.

FIG. 3 is a perspective view schematically illustrating one example of an exhaust gas-treating body included in the exhaust gas purifying apparatus according to the first embodiment of the present invention.

The exhaust gas-treating body (honeycomb filter) 130 shown in FIG. 3 mainly includes a porous ceramic material and has a substantially round pillar-shape. Moreover, a periphery coat layer 134 is formed on the outer periphery of the honeycomb filter 130 so as to reinforce the outer peripheral portion of the honeycomb filter 130, to adjust the shape, and to improve the heat insulating property of the honeycomb filter 130.

Here, the internal configuration of the honeycomb filter 130 is as already mentioned in the description on the exhaust gas purifying apparatus according to the first embodiment of the present invention (see FIG. 2).

The following description will discuss the casing included in the exhaust gas purifying apparatus according to the first embodiment of the present invention.

A casing 140 mainly includes a metal such as stainless steel. The shape thereof may be, as illustrated in FIG. 4, a substantially round pillar-shape in which the inner diameter of each end is smaller than that of the center part or a substantially round pillar-shape in which the inner diameter is constant.

The inner diameter (inner diameter of the part housing the exhaust gas-treating body) of the casing is preferably a bit smaller than the total length of the diameter of the end face of the exhaust gas-treating body and the thickness of the holding sealing material (mat) wound around the exhaust gas-treating body.

The following description will discuss a method for producing an exhaust gas purifying apparatus according to the first embodiment of the present invention.

Figure 4:
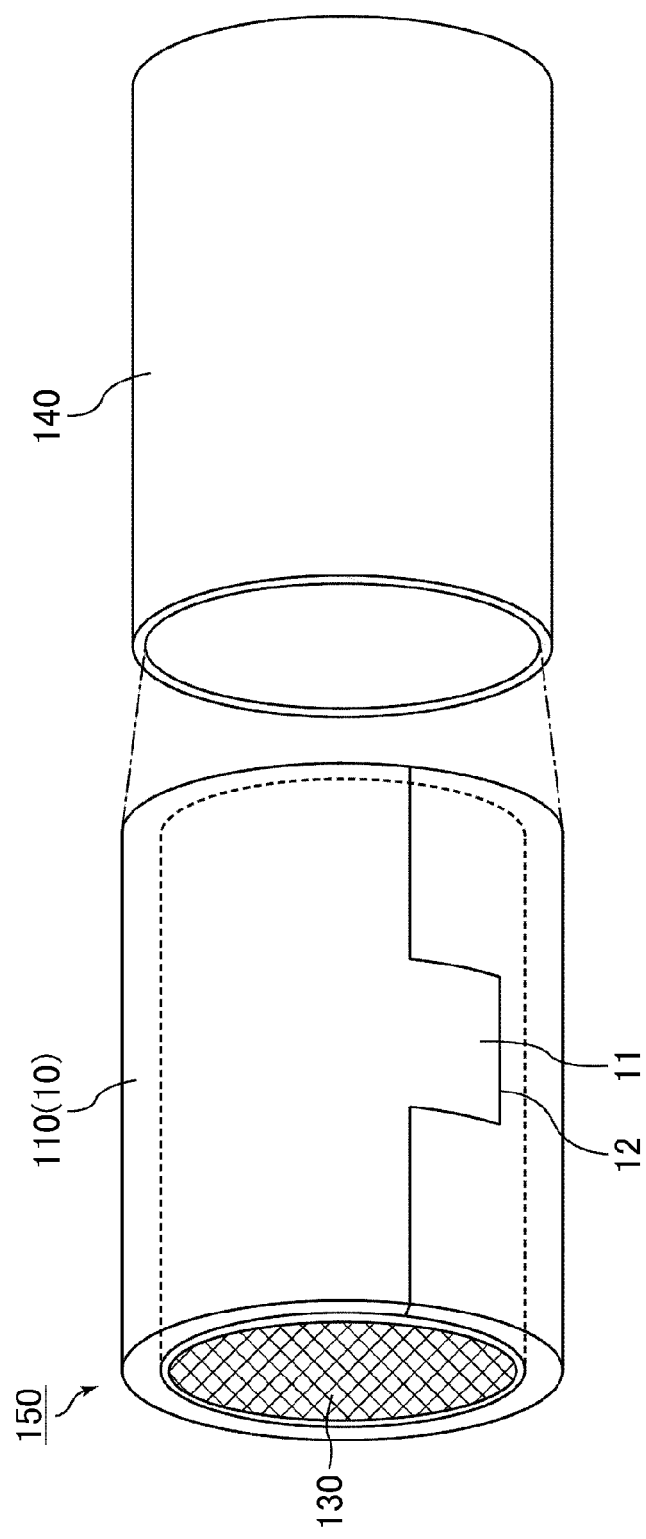
FIG. 4 is a perspective view schematically illustrating one example of a method for producing the exhaust gas purifying apparatus according to the first embodiment of the present invention.

FIG. 4 is a perspective view schematically illustrating one example of the method for producing an exhaust gas purifying apparatus according to the first embodiment of the present invention. FIG. 4 illustrates a case where a substantially round pillar-shaped casing having a constant inner diameter is used.

First, as shown in FIG. 1A, the mat 11 is wound around the exhaust gas-treating body (honeycomb filter) 130 to produce a wound body (exhaust gas-treating body with the holding sealing material wound therearound) 150.

The mat 11 is wound around the periphery of the exhaust gas-treating body 130 in a substantially round pillar shape by a conventionally known method in such a manner that the protrusion 12 and the depression 13 engage with each other.

As a result, the wound body 150 in which the holding sealing material 110 is wound around the exhaust gas-treating body 130 is produced.

The wound body 150 is then housed in the casing 140. The casing is in a substantially round pillar shape of a predetermined size and mainly formed of a metal.

The inner diameter of the casing 140 is a bit smaller than the outermost diameter of the exhaust gas-treating body 130 with the holding sealing material 110 wound therearound including the thickness of the holding sealing material 110, so that the housed holding sealing material is compressed to exert a predetermined repulsive force (i.e., force for holding an exhaust gas-treating body).

The exhaust gas purifying apparatus 100 illustrated in FIG. 2 can be produced by the above method.

Examples of a method for housing the wound body in the casing include injection (stuffing method) in which the wound body is injected to a predetermined position inside the casing, sizing (swaging) in which the wound body is inserted into the casing and the casing is compressed from the peripheral side so that the inner diameter is decreased, and the clamshell method in which the casing is a part separable into two parts including a first casing and a second casing and the wound body mounted on the first casing was covered with the second casing to be sealed.

In the following, effects of the holding sealing material, the method for producing the holding sealing material, and the exhaust gas purifying apparatus according to the first embodiment of the present invention are listed.

(1) In the holding sealing material of the present embodiment, since an inorganic binder is loaded, the inorganic binder presumably fixes the inorganic fibers at intersections thereof. This tends to increase the surface pressure and the shear stress of the holding sealing material. Accordingly, the holding sealing material included in an exhaust gas purifying apparatus tends to have enhanced force for holding an exhaust gas-treating body, so that the mat is not too much deformed during canning and the canning process is more easily carried out.

(2) In the holding sealing material of the present embodiment, an inorganic binder is loaded on inorganic fibers in the mat and an organic binder is loaded on the upper part and the lower part of the mat. Accordingly, intersections of fibers are fixed with the inorganic binder and voids between the fibers and the intersections are filled with the organic binder. Therefore, scattering of fibers is reduced compared to the case where an organic binder or an inorganic binder is solely used. Such a synergy effect makes it easier to enclose short and easily-scattering inorganic fibers inside the mat and to suppress scattering of inorganic fibers during canning so that the work environment during the canning is more easily improved.

(3) The holding sealing material of the present embodiment includes at least one kind of inorganic fibers selected from the group consisting of alumina fibers, alumina-silica fibers, silica fibers, biosoluble fibers, and glass fibers. Therefore, the holding sealing material can more easily have required properties such as thermal resistance of the mat.

(4) In the holding sealing material of the present embodiment, the mat included in the holding sealing material is needle-punched to intertwine inorganic fibers. Accordingly, the bulk of the mat is more easily appropriately reduced, so that the work efficiency during canning is more easily improved. Moreover, intertwinement of inorganic fibers makes it easier to increase the surface pressure of the mat so that the mat can more easily hold the exhaust gas-treating body.

(5) In the method for producing a holding sealing material of the present embodiment, the loaded amount of the inorganic binder is adjusted within a predetermined range during dehydration, and the organic binder-containing liquid is loaded before completion of drying of the inorganic binder-containing liquid. Accordingly, in a part where both the inorganic binder and the organic binder are present, the binders mixed together increases the viscosity and the adhesiveness of a mixed solution to allow easy clinging to inorganic fibers, so that the mixed solution are more easily loaded on inorganic fibers in a broader area. Easily-scattering inorganic fibers are likely to adhere to the mixed solution loaded on the inorganic fibers. Such a synergy effect of the inorganic binder and the organic binder which contain moisture makes it easier to enclose easily-scattering short inorganic fibers inside the mat so that scattering of inorganic fibers during canning is more easily suppressed.

(6) In the method for producing a holding sealing material of the present embodiment, latex containing acryl, acrylonitrile-butadiene, or styrene-butadiene rubber dispersed in water may be used as the organic binder-containing liquid. Presumably, the rubber having excellent adhesiveness adheres to easily-scattering free short inorganic fibers and bonds the short inorganic fibers and long inorganic fibers via rubber. Accordingly, scattering of inorganic fibers from the mat is more easily prevented.

(7) Including the holding sealing material according to the present embodiment or the holding sealing material produced by the method for producing a holding sealing material according to the present embodiment, the exhaust gas purifying apparatus of the present embodiment can more easily enjoy various effects mentioned above.

EXAMPLES

In the following, the first embodiment of the present invention is more specifically disclosed by using examples. The present invention is not limited only to these examples.

In the present example, a holding sealing material and a method for producing the same are described which disclose the first embodiment of the present invention in more detail.

Example 1

(a) Preparation of Mat

A mat for a holding sealing material was prepared in the following procedure.
(a-1) Spinning A silica sol was blended with an aqueous basic aluminum chloride solution having an Al content of 70 g/L and a ratio of Al:Cl=1:1.8 (atomic ratio), in such a manner that the proportion of inorganic fibers after firing is $Al_2O_3$:$SiO_2$=72:28 (weight ratio). A proper amount of an organic polymer (polyvinyl alcohol) was added thereto to prepare a mixed solution.

The obtained mixed solution was concentrated to give a mixture for spinning. The mixture for spinning was spun by blowing to produce inorganic fiber precursors having an average fiber diameter of 5.1 μm.
(a-2) Compression The inorganic fiber precursors produced in the treatment (a-1) were compressed to provide a continuous sheet-like product.
(a-3) Needle Punching The sheet-like product produced in the treatment (a-2) was continuously needle-punched under the following conditions to give a needle-punched body.

A needle board with needles provided at a density of 21 pcs/cm² was prepared. The needle board was disposed above a surface of the sheet-like product and moved once vertically in the thickness direction of the sheet-like product to perform needle punching for producing a needle-punched body. In this needle punching, needles are allowed to penetrate the sheet-like product until barbs formed at the tops of the needles completely appears on the other face of the sheet-like product.

(a-4) Firing

The needle-punched body produced in the treatment (a-3) was continuously fired at a maximum temperature of 1250° C. to produce a fired sheet-like product including inorganic fibers that contain alumina and silica at a ratio of 72:28 (parts by weight). The inorganic fibers had an average fiber diameter of 5.1 μm. The minimum value of the inorganic fiber diameter was 3.2 μm. The fired sheet-like product made of alumina fiber obtained in this manner had a bulk density of 0.15 g/cm³ and a weight per unit area of 1400 g/m².

(a-5) Cutting

The fired sheet-like product produced in the treatment (a-4) was cut into a cut sheet-like product (mat 10).

(b) Impregnation

A commercially available alumina sol (produced by NISSAN CHEMICAL INDUSTRIES, LTD. Alumina sol-200 (solid content concentration of 10 wt %)) was diluted with water to prepare a liquid having a solid content concentration of 1 wt %. The resulting inorganic binder-containing liquid was made in contact with inorganic fibers in the mat by curtain coating so that the inorganic fibers in the mat were impregnated with the alumina sol.

(c) Dehydration

The mat impregnated with the alumina sol was vacuum-dehydrated by a dehydrator so that the loaded amount of the alumina sol per unit weight of inorganic fibers was adjusted to 1.0 g/100 g in solid content.

(d) Spraying

Latex (produced by ZEON CORPORATION LX-811H) containing acrylic rubber dispersed in water was diluted with water to give an organic binder-containing liquid having a solid content concentration of 1 wt %. The organic binder-containing liquid was sprayed to the upper and lower faces of the mat 11 in such a manner that the loaded amount of the organic binder per unit weight of inorganic fibers of the upper part 11a and the lower part 11b of the mat 11 was adjusted to 1.0 g/100 g.

(e) Drying

The mat 11 impregnated with the inorganic binder-containing liquid and the organic binder-containing liquid was through-flow dried at 135° C. to give a mat with the inorganic binder and the organic binder loaded thereon.

(f) Cutting

The resulting needle-punched mat was cut into a size in a plan view of 776 mm in overall length×290 mm in width, with a protrusion 12 having a length L of 400 mm and a width W of 100 mm on one end and a depression 13 engaging with the protrusion 12 on the other end. In this manner, the holding sealing material 10 was produced.

Comparative Example 1

A holding sealing material was produced in the same manner as in Example 1, except that no inorganic binder was loaded. Table 1 shows the loaded amounts of the organic binder and the inorganic binder in Comparative Example 1.

Comparative Example 2

A holding sealing material was produced in the same manner as in Example 1, except that no inorganic binder was loaded and a mat 11 was immersed in an organic binder-containing liquid so that an organic binder was loaded. Namely, in Comparative Example 2, an organic binder is loaded on the entire region of the mat 11. Table 1 shows the loaded amounts of an organic binder and an inorganic binder in Comparative Example 2.

Comparative Example 3

A holding sealing material was produced in the same manner as in Example 1, except that no organic binder was loaded. Table 1 shows the loaded amounts of the organic binder and the inorganic binder in Comparative Example 3.

(Determination of the Loaded Amounts of the Inorganic Binder and the Organic Binder)

The loaded amount of the inorganic binder is calculated as follows. A mat with an organic binder and an inorganic binder loaded thereon was heated at 700° C. so that the organic binder was volatilized. Then, inorganic fibers in portions of about 0.2 g were taken out respectively from the upper part 11a, the center part 11c, and the lower part 11b. The aluminum concentrations before and after loading of the organic binder and the inorganic binder were compared by chelatometric titration.

The loaded amount of the organic binder was calculated as follows. The mat with an organic binder and an inorganic binder loaded thereon was cut into a size of 100 mm×100 mm. The cut sample was divided into three parts including an upper part 11a, a center part 11c, and a lower part 11b, and then heated at 700° C. in oxidizing atmosphere. The weight reduction of each part was measured. Based on the measurements, the loaded amount of the organic binder was calculated.

(Measurement of Scattering of Inorganic Fibers in the Mat)

The weight reduction rate A represented by Equation (1) was the amount A of inorganic fiber scattering. In the equation (1), $W_1$ represents the weight of each of the mats 11 obtained in the examples and the comparative examples after a winding test and $W_0$ represents the weight before the winding test. Here, in the winding test, the mat 11 was wound around an exhaust gas-treating body having a diameter of 80 mm. Table 1 shows the results. The mat 11 is placed on a jig with a groove in a half-cylinder shape. An exhaust gas-treating body is placed thereon and put into the groove of the jig manually so that the mat 11 was wound therearound.

$$A(\text{wt \%})=[(W_0-W_1)/W_0]\times 100 \quad (1)$$

(Measurement of the Surface Pressure of the Mat)

The surface pressure of each of the mats 11 obtained in the examples and the comparative examples was measured by the following method.

Here, a hot surface pressure tester produced by MTS Corporation was used for measurement of the surface pressure.

A sample was compressed at room temperature to have a bulk density (GBD) of 0.3 g/cm³, and held for 10 minutes. The bulk density of the sample was the value calculated from the equation "bulk density=weight of the sample/(area of the sample×thickness of the sample)".

The sample in a compressed state was heated until one face reached 900° C. and the other face reached 650° C. at 40° C./min, and the bulk density was released to 0.273 g/cm³. The sample having one face at 900° C. and the other face at 650° C. and a bulk density of 0.273 g/cm³ was held for five minutes.

Then, the sample was compressed at 1 inch (25.4 mm)/min until the bulk density reached 0.3 g/cm³. The load when the bulk density reached 0.3 g/cm³ was measured. The measured load was divided by the area of the sample so that the surface pressure (kPa) was obtained. Table 1 shows the results.

(Measurement of the Shear Stress of the Mat)

Each of the mats 11 obtained in the examples and the comparative examples was cut into a size in a plan view of 50×50 mm as a sample for measuring the shear strength.

Figure 5:
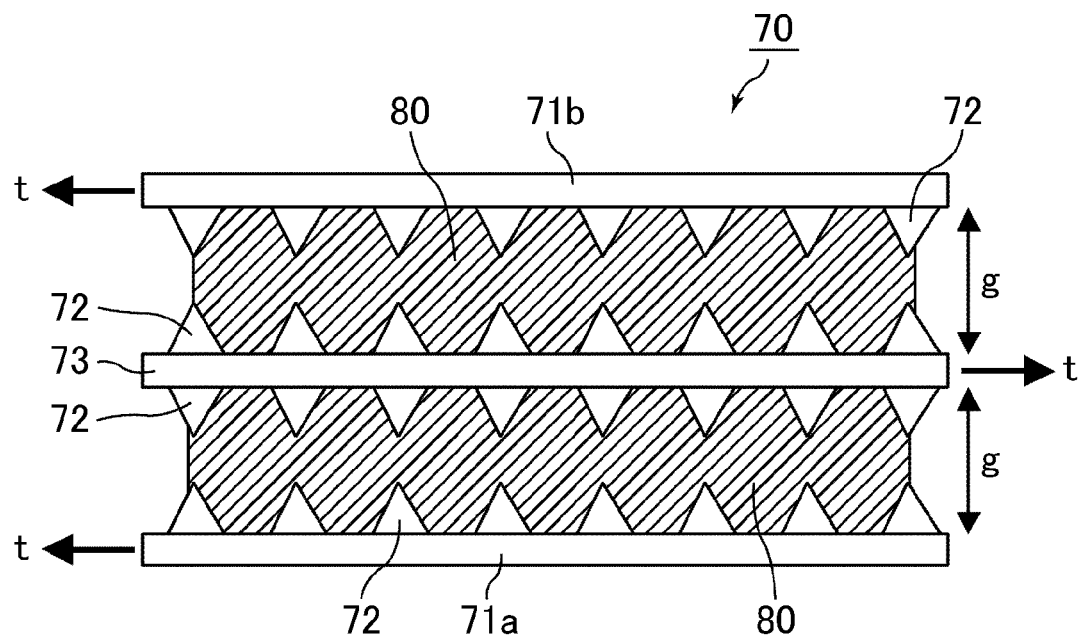
FIG. 5 is a conceptual view schematically illustrating a shear strength tester for testing a shear stress.

The shear stress was measured using a shear strength tester 70 illustrated in FIG. 5.

A first sample 80 for measurement was placed on the main face of a first plate material 71a where projections 72 are formed. An interlayer plate material 73 with protrusions 72 formed on both faces is placed thereon so that the first sample 80 for measurement is sandwiched at a predetermined distance g.

Then, a second sample 80 for measurement was placed on the interlayer plate material 73. On the second sample 80 for measurement, a second plate material 71b was further placed at the predetermined distance g.

In this manner, two samples 80 for measurement were separately sandwiched by three plate materials and then compressed.

At this time, intervals of three plate materials were adjusted in such a manner that the density of each compressed sample was set to 0.3 g/cm³.

Next, upper and lower plate materials 71a and 71b were pulled in one direction and the interlayer plate material 73 was pulled in the opposite direction (directions indicated by arrows "t" in FIG. 5). The stress (N) generated at that time was measured as a shear stress. Table 1 shows the results.

of inorganic fibers. In each of the holding sealing material according to Comparative Examples 1 and 2 in which only an organic binder was loaded and no inorganic binder was loaded, though scattering of inorganic fibers was comparatively small, the surface pressure and the shear stress of the mat were small, so that the required properties of the holding sealing material were not satisfied. In the holding sealing material according to Comparative Example 3 in which only an inorganic binder was loaded and no organic binder was loaded, scattering of inorganic fibers was large.

Second Embodiment

A holding sealing material according to the second embodiment was as same as the holding sealing material according to the first embodiment, except that the loaded amount of the organic binder was changed.

Namely, inorganic fibers included in the holding sealing material and the shape of the holding sealing material were as same as those in the first embodiment. The kind of the inorganic binder to be loaded on the inorganic fibers and the loaded amount of the inorganic binder were as same as those in the first embodiment.

The kind of an organic binder to be loaded on the inorganic fibers included in the mat 11 may be the same as that used in the holding sealing material according to the first embodiment. However, the amount of the organic binder to be loaded on the inorganic fibers is different.

Namely, the loaded amount of the organic binder per unit weight of inorganic fibers is larger on the upper part 11a of the mat 11 than on the lower part 11b of the mat 11. Alternatively, the loaded amount of the organic binder per unit weight of inorganic fibers is larger on the lower part 11b than on the upper part 11a.

In the case where the loaded amount of the organic binder per unit weight of inorganic fibers is larger on the upper part 11a than on the lower part 11b of the mat 11, the loaded amount of the organic binder per unit weight of inorganic fibers on the lower part 11b of the mat 11 is preferably from about 0.5 to about 10.0 g/100 g, more preferably from about 0.5 to about 6.0 g/100 g, and still more preferably from about 2.0 to about 3.0 g/100 g, as in the case of the holding sealing material according to the first embodiment. On the upper part

TABLE 1

| | Loaded amount of inorganic binder | Loaded amount of organic binder (g/100 g) | | | Scattering | Surface pressure | Shear stress |
|---|---|---|---|---|---|---|---|
| | (g/100 g) | Upper part | Center part | Lower part | (wt %) | (kPa) | (N) |
| Example 1 | 1.0 | 2.0 | 0.3 | 1.4 | 0.023 | 34.1 | 152.7 |
| Comparative Example 1 | — | 2.1 | 0.4 | 1.5 | 0.018 | 26.1 | 125.1 |
| Comparative Example 2 | — | 1.4 | 1.0 | 0.7 | 0.043 | 22.3 | 88.4 |
| Comparative Example 3 | 1.0 | — | — | — | 0.079 | 37.3 | 178.6 |

As shown in Table 1, scattering of inorganic fibers was small and the surface pressure and the shear stress of the mat were large in each of the holding sealing materials according to the examples in which an inorganic binder was loaded on the mat included in the holding sealing material in an amount of 1.0 g/100 g per unit weight of inorganic fibers and the organic binder was, when the mat is divided into three parts including an upper part, a center part, and a lower part in the thickness direction, mainly loaded on the upper part and the lower part in an amount of 2.0 to 3.0 g/100 g per unit weight 11a of the mat 11, the loaded amount of the organic binder per unit weight of inorganic fibers is larger than the above mentioned amount.

In the case where the loaded amount of the organic binder per unit weight of inorganic fibers is larger on the upper part 11a than on the lower part 11b of the mat 11, the loaded amount of the organic binder per unit weight of inorganic fibers is preferably larger on the upper part 11a than on the lower part 11b of the mat 11 by from about three to about five times.

The reverse of the above case will take place in the case where the loaded amount of the organic binder per unit weight of inorganic fibers is larger on the lower part 11b than on the upper part 11a. Namely, the loaded amount of the organic binder per unit weight of inorganic fibers on the upper part 11a of the mat 11 is, as in the case of the holding sealing material of the first embodiment, preferably from about 0.5 to about 10.0 g/100 g, more preferably from about 0.5 to about 6.0 g/100 g, and still more preferably from about 2.0 to about 3.0 g/100 g. On the other hand, the loaded amount of the organic binder per unit weight of inorganic fibers in the lower part 11b of the mat 11 is larger than the amount mentioned above.

In the case where the loaded amount of the organic binder per unit weight of inorganic fibers is larger on the lower part 11b of the mat 11 than on the upper part 11a of the mat 11, the loaded amount of the organic binder per unit weight of inorganic fibers is preferably larger on the lower part 11b than on the upper part 11a of the mat 11 by from about three to about five times.

Since the loaded amount of the organic binder per unit weight of inorganic fibers of the mat is larger on the lower part than on the upper part or the reverse thereof, the holding sealing material used in an exhaust gas purifying apparatus is disposed in such a manner that the surface of the mat with more organic binder is loaded thereon is in contact with a casing and the surface with less organic binder loaded thereon is in contact with an exhaust gas-treating body.

When the holding sealing material is used in an exhaust gas purifying apparatus, the mat is wound around an exhaust gas-treating body. Therefore, inorganic fibers are likely to scatter from the face of the mat in contact with the casing. However, since the loaded amount of the organic binder in a part in contact with the casing is large, the inorganic fibers are less likely to scatter so that scattering of inorganic fibers during canning is more easily suppressed.

Arrangement of the mat as mentioned above makes it easier to prevent cracking of the mat in a part in contact with the casing and also to prevent creases in a part in contact with the exhaust gas-treating body.

Namely, if the loaded amount of the organic binder is small in a part in contact with the casing in the mat, the mat is cracked in the part in contact with the casing during canning to allow exhaust gases to easily pass through the cracked part. In the embodiment of the present invention, however, development of such a problem can be more easily suppressed.

If the loaded amount of the organic binder is too large in a part in contact with the exhaust gas-treating body in the mat, creases are easily caused in the part in contact with the exhaust gas-treating body to allow exhaust gases to easily pass through the part with creases. In the embodiment of the present invention, however, development of such a problem can be more easily suppressed.

The following description will discuss the method for producing a holding sealing material according to the second embodiment.

The holding sealing material according to the second embodiment can be produced by the following method for producing a holding sealing material.

In the method for producing a holding sealing material according to the second embodiment, the treatments other than spraying, namely, (a) Preparation of mat, (b) Impregnation, (c) Dehydration, (e) Drying, and (f) Cutting are as same as those in the method for producing a holding sealing material according to the first embodiment.

In the treatment of (d) Spraying in the second embodiment, the organic binder-containing liquid are sprayed to the main face of the upper part of the mat and the main face of the lower part of the mat in such a manner that the loaded amount of the organic binder per unit weight of inorganic fibers is different from each other.

Here, the organic binder-containing liquid to be sprayed to the main face of the upper part of the mat is set to have a concentration different from that of the organic binder-containing liquid to be sprayed to the main face of the lower part of the mat, and the organic binder-containing liquids different in organic binder concentration may be respectively sprayed to the faces. Alternatively, the organic binder-containing liquids having the same concentration may be sprayed to the faces in such a manner that the loaded amount of the organic binder-containing liquid is different from each other.

Then, through drying treatment, the loaded amount of the organic binder per unit weight of inorganic fibers is larger on the upper part 11a than on the lower part 11b of the mat 11, or the loaded amount of the organic binder per unit weight of inorganic fibers is larger on the lower part 11b than on the upper part 11a of the mat 11.

(Exhaust Gas Purifying Apparatus)

An exhaust gas purifying apparatus is also as same as the exhaust gas purifying apparatus according to the first embodiment, except that the holding sealing material to be used in the exhaust gas purifying apparatus is the holding sealing material according to the second embodiment.

In the following, effects of the holding sealing material, the method for producing the holding sealing material, and the exhaust gas purifying apparatus according to the second embodiment of the present invention are listed.

In the present embodiment, the effects (1) to (7) mentioned in the first embodiment are exerted. In addition, the following effects are further exerted by arrangement of the holding sealing material used in the exhaust gas purifying apparatus in such a manner that the face of the mat with more organic binder loaded thereon is in contact with the casing and the surface of the mat with less organic binder loaded thereon is in contact with the exhaust gas-treating body.

(8) When the holding sealing material is used in an exhaust gas purifying apparatus, the mat is wound around an exhaust gas-treating body. Therefore, inorganic fibers are commonly likely to scatter from the face of the mat in contact with the casing. Here, however, since the loaded amount of the organic binder is large in apart in contact with the casing is large, inorganic fibers are less likely to scatter, leading to easier suppression of inorganic fiber scattering during canning.

(9) Arrangement of the mat as mentioned above makes it easier to prevent cracking of the mat in a part in contact with the casing and also to prevent creases in a part in contact with the exhaust gas-treating body.

Namely, if the loaded amount of the organic binder is small in a part in contact with the casing in the mat, the mat is commonly cracked in the part in contact with the casing during canning to allow exhaust gases to easily pass through the cracked part. In the second embodiment, however, development of such a problem can be more easily suppressed.

If the loaded amount of the organic binder is too large in a part in contact with the exhaust gas-treating body in the mat, creases are commonly caused in the part in contact with the exhaust gas-treating body to allow exhaust gases to easily pass through the part with creases. In the second embodiment, however, development of such a problem can be more easily suppressed.

Examples 2 to 3

Mats were each prepared in the same manner as in (a-1) to (a-5) of Example 1.

Similarly, in the treatments (b) Impregnation and (c) Dehydration, the inorganic binder was loaded on inorganic fibers in the same manner as in Example 1.

(d) Spraying

An organic binder prepared in the same manner as in Example 1 was loaded in such a manner that the loaded amount of the organic binder is different in the upper part and in the lower part by adjustment of the spraying amount. Then, the treatments (e) Drying and (f) Cutting were carried out in the same manner as in Example 1. Accordingly a holding sealing material 10 was produced.

Comparative Example 4

A holding sealing material was produced in the same manner as in Example 2 except that no inorganic binder was loaded. Table 2 shows the loaded amounts of the organic binder and the inorganic binder in Comparative Example 4.

Comparative Example 5

A holding sealing material was produced in the same manner as in Example 2 except that no organic binder was loaded. Table 2 shows the loaded amounts of the organic binder and the inorganic binder in Comparative Example 5.

In Examples 2 to 3 and Comparative Examples 4 to 5, in the same manner as in Example 1, the loaded amounts of the inorganic binder and the organic binder are determined, and scattering of the inorganic fibers in the mat, the surface pressure of the mat, and the shear stress of the mat were measured. Table 2 shows the results.

TABLE 2

| | Loaded amount of inorganic binder (g/100 g) | Loaded amount of organic binder (g/100 g) | | | Scattering (wt %) | Surface Pressure (kPa) | Shear stress (N) |
|---|---|---|---|---|---|---|---|
| | | Upper part | Center part | Lower part | | | |
| Example 2 | 1.0 | 2.1 | 0.4 | 0.5 | 0.022 | 33.2 | 150.2 |
| Example 3 | 1.0 | 0.6 | 0.3 | 2.5 | 0.020 | 32.3 | 149.1 |
| Comparative Example 4 | — | 2.0 | 0.3 | 0.7 | 0.024 | 25.3 | 123.1 |
| Comparative Example 5 | 1.0 | — | — | — | 0.049 | 37.3 | 178.6 |

As shown in Table 2, in Examples 2 and 3, though the scattering of inorganic fibers was almost the same as that in Comparative Example 4, the surface pressure and the shear strength were higher. In Example 2, the inorganic binder was loaded on the mat included in the holding sealing material in an amount of 1.0 g/100 g per unit weight of inorganic fibers and, when the mat was divided into three parts including an upper part, a center part, and a lower part in the thickness direction, the loaded amount of the organic binder was larger on the upper part and the loaded amounts of the organic binder on the center part and the lower part were smaller than that on the upper part. In Example 3, the loaded amount of the organic binder was larger mainly on the lower part, and the loaded amounts of the organic binder on the center part and on the upper part were smaller than that on the lower part. In Comparative Example 4, the loaded amount of the organic binder was similar to that in Example 2 and no inorganic binder was loaded. In Comparative Example 5 in which no organic binder was loaded, the surface pressure and the shear stress were not different from those in Examples 2 and 3 but the scattering of inorganic fibers was large. Accordingly, in total evaluation of the scattering of inorganic fibers, the surface pressure, and the shear stress, the holding sealing materials according to Examples 2 and 3 were superior to the holding sealing materials according to Comparative Examples 4 and 5.

Other Embodiments

The shapes of the depression and the protrusion formed on the end faces of the mat according to the embodiments of the present invention are not particularly limited, provided that the depression and the protrusion engage with each other. In the case where a pair of a depression and a protrusion are formed, preferably, a protrusion having a size of about 10 mm in width×about 10 mm in length to about 300 mm in width× about 100 mm in length is formed on one end face, and a depression engaging therewith is formed on the other end face.

If a mat having such a depression and a protrusion is used as a holding sealing material for production of an exhaust gas purifying apparatus, the exhaust gas-treating body can be firmly supported by the holding sealing material, leading to easier handleability.

Since the size of the protrusion is larger than about 10 mm in width×about 10 mm in length or smaller than about 300 mm in width×about 100 mm in length, the contact area between the end faces of the mat tends not to be small when the mat is wound around the exhaust gas-treating body. Therefore, the end faces of the mat are easily bonded one another. As a result, the exhaust gas-treating body is easily supported by the holding sealing material.

In the mat according to the embodiments of the present invention, end faces of the mat may have a plurality of depressions and protrusions engage with each other. Alternatively, end faces of the mat may have no depression and no protrusion.

The shape of "approximately rectangular shape in a plan view" mentioned in the description on the mat according to the first embodiment of the present invention may conceptually include a protrusion and depression as illustrated in FIG. 1A. The shape of "approximately rectangular shape in a plan view" also includes a shape in which edges of the mat each have an angle other than about 90°. For example, the mat may have a shape in which edges have acute angles, obtuse angles, or curvature.

The holding sealing material according to the first embodiment of the present invention may further contain an expansive agent. The expansive agent preferably expands in a temperature range of from about 400° C. to about 800° C.

The mat impregnated with the expansive agent expands in a temperature range of from about 400° C. to about 800° C. Therefore, even in a high temperature range exceeding about 700° C. in which the strength of glass fibers is likely to be lowered, the mat used as the holding sealing material is more likely to have an enhanced holding force.

Examples of the expansive agent include vermiculite, bentonite, bronze mica, perlite, expansive graphite, and expansive mica fluoride. Each of these may be used alone, or two or more of these may be used in combination.

The amount of the expansive agent to be added is not particularly limited, and is preferably from about 10 to about 50 wt % and more preferably from about 20 to about 30 wt % for the total weight of the mat.

In the case of using the mat according to the embodiment of the present invention as a holding sealing material of an exhaust gas purifying apparatus, the number of sheets of the holding sealing material included in the exhaust gas purifying apparatus is not particularly limited. One sheet of the holding sealing material may be used, or plural sheets of the holding sealing materials mutually combined with one another may also be used.

Examples of the method for combining the plural holding sealing materials include a method in which the holding sealing materials are mutually stitched together with a sewing machine, a method in which holding sealing materials are mutually bonded to one another by using an adhesive tape, an adhesive material or the like, although not limited thereto.

The material for the casing included in the exhaust gas purifying apparatus according to the embodiment of the present invention is not particularly limited as long as it is a metal having heat resistance, and specific examples of the material include metals such as stainless steel, aluminum, and iron.

The shape of the casing included in the exhaust gas purifying apparatus according to the embodiment of the present invention may be preferably a clam shell shape, a downsizing type shape, or the like, other than an approximately cylindrical shape.

The shape of the exhaust gas-treating body in the exhaust gas purifying apparatus according to the embodiment of the present invention is not particularly limited as long as it is a pillar shape. Other than an approximately round pillar shape, any pillar shape, such as an approximately cylindroid shape and a substantially rectangular pillar shape, in a desired size may be employed.

The exhaust gas-treating body included in the exhaust gas purifying apparatus according to the embodiment of the present invention may be an integral honeycomb structure which includes a cordierite or the like and is integrally formed. The exhaust gas-treating body may also be an aggregated honeycomb structure including silicon carbide or the like, in which a plurality of pillar-shaped honeycomb fired bodies are bonded by an adhesive layer mainly containing ceramic therebetween, each of the honeycomb fired bodies having a large number of through holes placed in parallel with one another in the longitudinal direction with a separation wall therebetween.

The exhaust gas-treating body included in the exhaust gas purifying apparatus according to the embodiment of the present invention may support a catalyst thereon.

Examples of the catalyst supported on the exhaust gas-treating body include noble metals such as platinum, palladium, and rhodium; alkali metals such as potassium and sodium; alkaline earth metals such as barium; and metal oxides such as cerium oxide. These catalysts may be used alone or two or more of them may be used in combination.

In the exhaust gas purifying apparatus according to the embodiment of the present invention, cells may not be provided with plugs and ends of the cells may not be sealed in the case where the exhaust gas-treating body is a honeycomb structure. In such a case, a catalyst such as platinum is supported on the exhaust gas-treating body so that the exhaust gas-treating body functions as a catalyst carrier for converting toxic gas components in exhaust gases, such as CO, HC, and NOx.

In the holding sealing materials according to the embodiments of the present invention, an inorganic binder and an organic binder are loaded on the mat in a predetermined thickness forming the holding sealing material. The organic binder is, when the mat is divided into three parts including an upper part, a center part, and a lower part in the thickness direction, mainly loaded on the upper part and the lower part. These are essential features of the holding sealing material of the embodiment of the present invention.

The essential features are appropriately combined with various elements (e.g., composition of glass fibers, shape of the mat, method for producing the mat) described in the first embodiment and other embodiments described in the present invention so that the desired effect is exerted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing an exhaust gas purifying apparatus, the method comprising:
    preparing a mat for a holding sealing material, the mat being needle-punched and including inorganic fibers, the mat having an inner part and an outer part in a thickness direction of the mat;
    contacting the mat with an inorganic binder-containing liquid containing an inorganic binder to impregnate the inorganic fibers in the mat with the inorganic binder-containing liquid;
    dehydrating the mat impregnated with the inorganic binder-containing liquid to control an amount of the inorganic binder-containing liquid loaded on the inorganic fibers within a predetermined range;
    spraying an organic binder-containing liquid containing an organic binder to the inner part of the mat and to the outer part of the mat such that a loaded amount of the organic binder per unit weight of the inorganic fibers in the outer part is more than loaded amount of the organic binder per unit weight of the inorganic fibers in the inner part;
    drying the mat loaded with the inorganic binder-containing liquid and the organic binder-containing liquid; and
    providing the holding sealing material between the exhaust gas-treating body and the casing to be wound around the exhaust gas-treating body, a surface of the outer part of the mat being in contact with the casing, a surface of the inner part of the mat being in contact with the exhaust gas-treating body.

2. The method according to claim 1,
    wherein the inorganic fibers include alumina fibers, alumina-silica fibers, silica fibers, biosoluble fibers, glass fibers, or a combination thereof.

3. The method according to claim 2,
    wherein the biosoluble fibers include from about 60 wt % to about 85 wt % of silica and from about 15 wt % to about 40 wt % of alkali metal compounds, alkaline earth metal compounds, boron compounds, or a combination thereof.

4. The method according to claim 1,
wherein the inorganic fibers have an average fiber length of from about 50 μm to about 100 mm and an average diameter of from about 2 μm to about 10 μm.

5. The method according to claim 1,
wherein the inorganic binder-containing liquid is an alumina sol or a silica sol.

6. The method according to claim 1,
wherein the mat is dehydrated by vacuum dehydration.

7. The method according to claim 1,
wherein the organic binder-containing liquid is a latex containing acrylic, acrylonitrile-butadiene, or styrene-butadiene rubber dispersed in water.

8. An exhaust gas purifying apparatus comprising:
a casing;
an exhaust gas-treating body housed in the casing;
a holding sealing material comprising:
   a mat including inorganic fibers and having an inner part and an outer part in a thickness direction of the mat;
   an inorganic binder loaded on the mat; and
   an organic binder loaded on the inner part and the outer part of the mat, a loaded amount of the organic binder per unit weight of the inorganic fibers in the outer part being more than a loaded amount of the organic binder per unit weight of the inorganic fibers in the inner part; and
the holding sealing material being wound around the exhaust gas-treating body and being disposed between the exhaust gas-treating body and the casing, a surface of the outer part of the mat being in contact with the casing, a surface of the inner part of the mat being in contact with the exhaust gas-treating body.

9. The exhaust as purifying apparatus according to claim 8,
wherein an amount of the organic binder per unit weight of the inorganic fibers is larger on the upper part of the mat than on the lower part of the mat, or the amount of the organic binder per unit weight of the inorganic fibers is larger on the lower part of the mat than on the upper part of the mat.

10. The exhaust gas purifying apparatus according to claim 9,
wherein the amount of the organic binder per unit weight of the inorganic fibers on the upper part is from about 0.5 g/100 g to about 10.0 g/100 g and the amount of the organic binder per unit weight of the inorganic fibers is larger on the lower part than on the upper part, or
the amount of the organic binder per unit weight of the inorganic fibers on the lower part is from about 0.5 g/100 g to about 10.0 g/100 g and the amount of the organic binder per unit weight of the inorganic fibers is larger on the upper part than on the lower part.

11. exhaust gas purifying apparatus according to claim 8,
wherein the inorganic fibers include alumina fibers, alumina-silica fibers, silica fibers, biosoluble fibers, glass fibers, or a combination thereof.

12. The exhaust gas purifying apparatus according to claim 11,
wherein the biosoluble fibers include from about 60 wt % to about 85 wt % of silica and from about 15 wt % to about 40 wt % of alkali metal compounds, alkaline earth metal compounds, boron compounds, or a combination thereof.

13. The exhaust gas purifying apparatus according to claim 8,
wherein the organic binder includes an epoxy resin, an acrylic resin, a rubber resin, or a styrene resin.

14. The exhaust has purifying apparatus according to claim 8,
wherein a thickness of the mat included in the holding sealing material is from about 1.5 mm to about 50 mm.

15. The exhaust gas purifying apparatus according to claim 8,
wherein the inorganic fibers have an average fiber length of from about 50 μm to about 100 mm and an average diameter of from about 2 μm to about 10 μm.

16. The exhaust gas purifying apparatus according to claim 8,
wherein the amount of the inorganic binder per unit weight of inorganic fibers is from about 0.5 g/100 g to about 3.0 g/100 g in solid content.

17. The exhaust gas purifying apparatus according to claim 8,
wherein the mat included in the holding sealing material is needle-punched to intertwine the inorganic fibers.

* * * * *